United States Patent [19]
Sehgal et al.

[11] Patent Number: 5,647,726
[45] Date of Patent: Jul. 15, 1997

[54] ROTOR SYSTEM VIBRATION ABSORBER

[75] Inventors: Ajay Sehgal, Bedford; Cecil E. Covington, Hurst; Mithat Yuce, Bedford; Bryan W. Marshall, Arlington, all of Tex.

[73] Assignee: Bell Helicopter Textron Inc., Hurst, Tex.

[21] Appl. No.: 599,562

[22] Filed: Feb. 15, 1996

[51] Int. Cl.⁶ ........................................ B64C 27/06
[52] U.S. Cl. .................... 416/145; 416/500; 188/380
[58] Field of Search ............................ 416/144, 145, 416/500; 74/574; 267/140.5; 188/379, 380

[56] References Cited

U.S. PATENT DOCUMENTS

| | | |
|---|---|---|
| 2,576,105 | 11/1951 | Childs . |
| 3,219,120 | 11/1965 | Hooper . |
| 3,298,443 | 1/1967 | Burkam et al. . |
| 3,387,505 | 6/1968 | Rumsey . |
| 3,509,971 | 5/1970 | Gerstine et al. . |
| 3,536,165 | 10/1970 | Desjardins ................ 188/380 |
| 3,910,720 | 10/1975 | Vincent et al. . |
| 4,044,628 | 8/1977 | Jacks . |
| 4,088,042 | 5/1978 | Desjardins et al. . |
| 4,140,028 | 2/1979 | Desjardins . |
| 4,145,936 | 3/1979 | Vincent et al. . |
| 4,160,390 | 7/1979 | Spaetgens . |
| 4,212,588 | 7/1980 | Fradenburgh . |
| 4,225,287 | 9/1980 | Vincent et al. . |
| 4,239,455 | 12/1980 | Broekhuizen et al. . |
| 4,255,084 | 3/1981 | Mouille et al. . |
| 4,281,967 | 8/1981 | Mouille et al. . |
| 4,365,770 | 12/1982 | Mard et al. . |
| 4,365,771 | 12/1982 | Halwes . |
| 4,596,513 | 6/1986 | Carlson et al. . |
| 5,190,244 | 3/1993 | Yana . |
| 5,228,640 | 7/1993 | Mouille . |
| 5,316,240 | 5/1994 | Girard et al. . |
| 5,383,133 | 1/1995 | Staple . |

FOREIGN PATENT DOCUMENTS

| | | |
|---|---|---|
| 4-34244 | 2/1992 | Japan ........................ 188/380 |
| 423615 | 2/1935 | United Kingdom . |
| 1465266 | 2/1977 | United Kingdom . |
| 2018392 | 10/1979 | United Kingdom . |

OTHER PUBLICATIONS

"A Fixed Frequency Rotor Head Vibration Absorber Based Upon G.F.R.P. Springs" by R.W. White, Paper Nr. 69, Fifth European Rotorcraft and Powered Lift Aircraft Forum, Sep. 1979.

*Primary Examiner*—Edward K. Look
*Assistant Examiner*—Mark Sgantzos
*Attorney, Agent, or Firm*—Sidley & Austin

[57] ABSTRACT

A vibration absorber having a mass member which when static is supported by in-plane springs spaced apart from a base plate, top plate and spring retaining structures. The mass member has a bumper surface for contacting a motion limiter in the base plate. The mass member, base plate and top plate can have a passageway through the axis. The vibration absorber can be tuned by proper selection of the springs, degree of precompression and the variation of the amount of mass by the addition or removal of mass tuning weights.

19 Claims, 14 Drawing Sheets

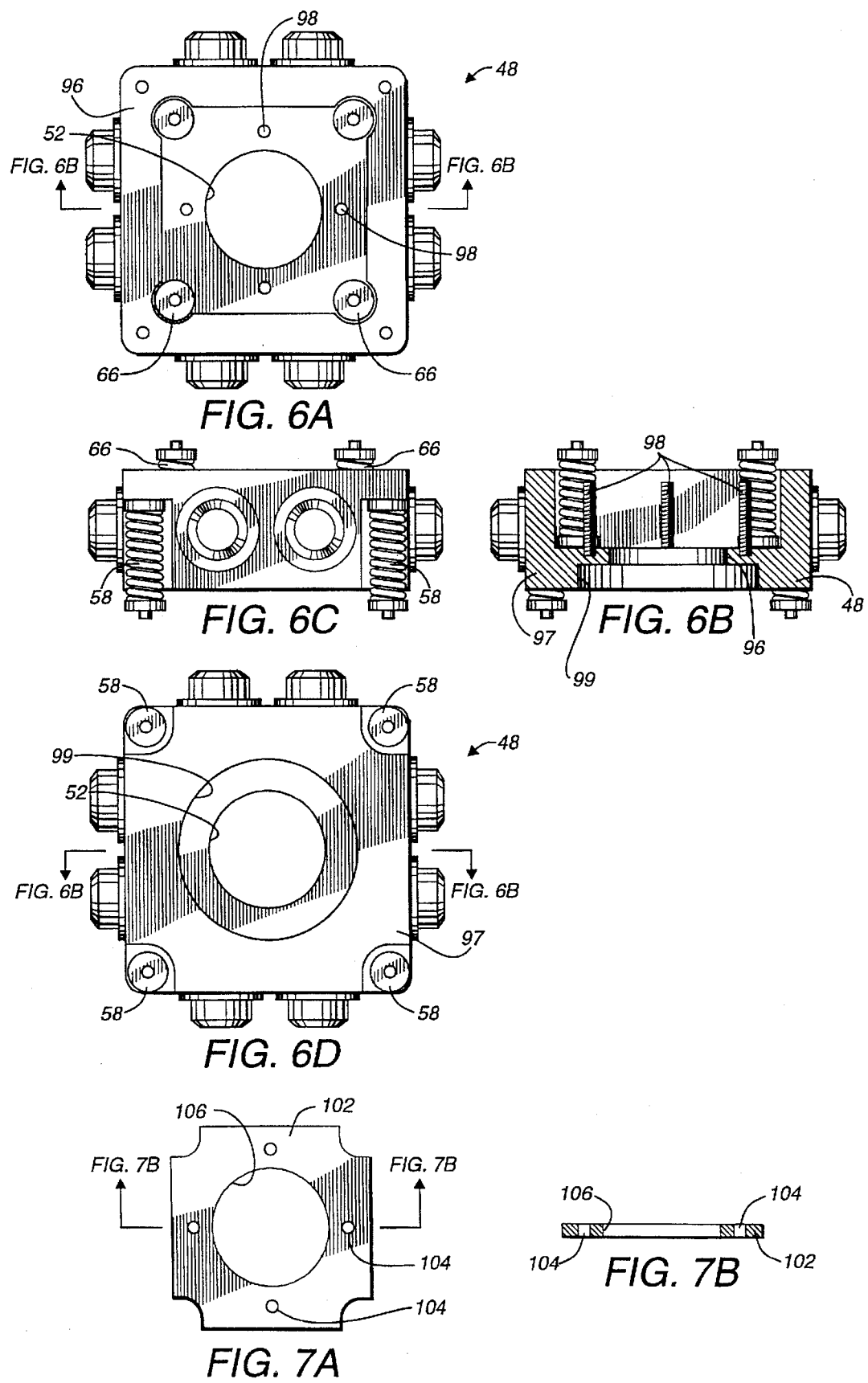

ROTOR SYSTEM VIBRATION ABSORBER

TECHNICAL FIELD OF THE INVENTION

The present invention relates to vibration absorber systems and in particular a system for reducing vibrations in helicopter rotor hubs.

BACKGROUND OF THE INVENTION

The rotating blades of the main rotor of a helicopter are subjected to a vibratory load as blades pass through the air. This vibratory load is passed along the blade at the blade passage frequency to the main rotor hub. These vibratory forces are transferred to the rotor mast in three directions; vertically along the axis of the rotor mast, longitudinally (in-plane) in the direction of flight, and longitudinally (in-plane) in a direction perpendicular to the direction of flight. By installing a vibration absorber at the hub, one can minimize excitation inherent to transverse airflow into a rotating wing virtually at the source.

Prior bifilar devices have the disadvantage that a large portion of the installed weight is ineffective. In addition, such devices rely on sliding or rolling metal surfaces in high, centrifugal fields which are not desirable from the reliability and maintainability point of view.

Another system which has been used is a weight installed on top of the rotor head by attaching the weight to a ball joint installed in the mast. Springs center the mass and allow the weight to flap in the horizontal plane. These devices rely on the ball joint to provide vertical retention which blocks off the hollow rotor mast. A large portion of the installed weight is not available for vibration reduction. A similar design employs spring arms with the inner ends bolted to the mast and the outer ends to the weight. This is a complex system that also does not use a significant portion of the weight effectively.

In another device, a group of air filled bladders and mechanical springs have to be used to support a mass. The pressure in the bladders can be varied to tune the device. While such devices have been described in the literature, they have not been employed commercially.

In order to be more effective, a vibration absorption system should react in all five directions (in-plane front and side, vertical, pitch and roll). The present invention in one aspect provides a system where the weight effectively compensates for vibration in all five directions. The present invention also has as an advantage that it can be constructed such that it has an opening along the axis of the rotor mast. Such an opening has the advantage of permitting electrical wiring and other conduits to pass through the inside of the rotor mast, above the rotor blades and beyond the vibration absorber. This allows for the easy connection of above the rotor equipment such as a mast mounted sight and slip ring. In another aspect, the present invention has the advantage of being designed to minimize vibration in an individual helicopter rotor system by varying the mass of the vibration absorber. In another aspect, the present invention relates to use of a motion limiter which allows a smaller mass to be used more efficiently in reducing vibration than conventional vibration absorbers. The system in another aspect is simple to maintain and simple to inspect. The absorber also has the advantage that multiple load paths can be provided to make the system redundant.

SUMMARY OF THE INVENTION

The invention provides for suspension of a mass by springs positioned in-plane which hold the mass when static spaced apart from the supporting framework and allow it to move in all directions, and provides for a motion limiter to limit the travel of the mass when operating and to cause the mass to move about the limiter.

In one embodiment the present invention has a base plate having an axis normal thereto with a motion limiter positioned about the axis; and with two or more in-plane end plates extending therefrom, a mass member disposed between said end plates with a lower side, top side, and out-of-plane sides; at least one in-plane spring interposed between each of the end plates and an out-of-plane side of the mass to hold the mass member spaced between and spaced apart from the end plates and spaced apart from the base plate and base plate when static, the mass has a cylinder surface on the lower side encircling the motion limiter. In the preferred embodiment, the motion limiter is a contact ring which is rotatable about the axis. The cylinder surface on the mass contacts the contact ring as the mass member vibrates and upon contact moves about the motion limiter. A top plate can be positioned above the mass member and attached to the base plate. Preferably the top plate, base plate and mass member have passageways through their centers which are aligned along the out-of-plane axis. In an alternative embodiment, one or more lower out-of-plane springs with each end being held by a helical receptacle and holding the mass member spaced apart from the base plate and one or more upper out-of-plane springs being received in helical receptacles positioned between the mass member and the top plate and holding the mass spaced apart from said upper plate.

In another embodiment, the present invention provides a vibration absorber having a base plate with a motion limiter extending upwardly about an axis normal to the base plate; spring positioners; two or more end plates extending from the base plate; a mass member positioned in between the end plates; one or more in-plane precompressed springs between each end plate and the mass member; two or more lower out-of-plane springs positioned between the base plate and mass member; a top plate attached to base plate and/or end plate; and two or more upper out-of-plane springs positioned between the top plate and mass member. The mass member when static is supported spaced apart from the base plate, top plate and end plates such that it is supported only by the springs. Preferably, each of the out-of-plane springs has a spring receptacle at each end.

In another aspect, the invention provides for a spring assembly having a coil spring having a tangential extension on both ends and a spring receptacle at the end of the spring, the receptacle having a helical channel dimensioned to mate with the end of the spring. Preferably, the spring wire is of uniform cross section throughout its length.

In another aspect, the base plate is provided with a central passage and the motion limiter assembly is attached about the passageway. The motion limiter assembly in a preferred embodiment has a bearing, a contact ring attached to the bearing to allow rotational movement of the contact ring with respect to the base plate.

In another aspect, the present invention provides for a mass tuning weight to be added to or removed from the mass member to increase or decrease the total mass. This aids in tuning the absorber for individual aircraft characteristics.

BRIEF DESCRIPTION OF THE DRAWINGS

The present invention will be better understood with reference to the preferred embodiments described in the detailed specification and in light of the following drawings.

FIG. 6A is a top view of one embodiment of a mass member together with out-of-plane springs;

FIG. 6B is a cross-sectional view of FIG. 6A;

FIG. 6C is a side view of FIG. 6A;

FIG. 6D is a bottom view of FIG. 6A;

FIG. 7A is a top view of a mass tuning weight;

FIG. 7B is a cross-sectional view of FIG. 7A;

DETAILED DESCRIPTION

The present invention is a vibration absorber having a spring-mass system which is dynamically tuned to reduce per-rev vibration in the rotor mast. The vibration absorber of the present invention can be tuned to reduce the per-rev vibration induced by the rotor blades. For example, on a four blade system the vibration absorber is tuned to reduce four per-rev vibrations and in a three blade system it is tuned to reduce three pere-rev vibrations. Likewise, the system can be tuned to reduce per-rev vibration for systems with different numbers of blades. The invention employs a movable mass suspended when static by at least two in-plane springs. "In-plane" is used herein as it is commonly used in the art to refer to the plane the rotor blades travel through or a plane parallel thereto. As a result, the mass is allowed to move in all five directions and thereby provide effective absorption of vibration. The absorber can be tuned by selection of the springs, spring rates and by increasing or reducing the suspended mass. The weight of the mass is preferably variable by providing a mass member designed to receive mass tuning weights which can be added or removed from the mass member. In an alternative embodiment, the mass can also be supported by out-of-plane (in a plane incident to "in-plane") by using springs above and below the mass.

The invention will be described assuming that the base plate is the bottom piece. However, it should be clear that the device can be made with the base plate as the uppermost part and it operated in an inverter position from that described.

Figures 1A, 1B:
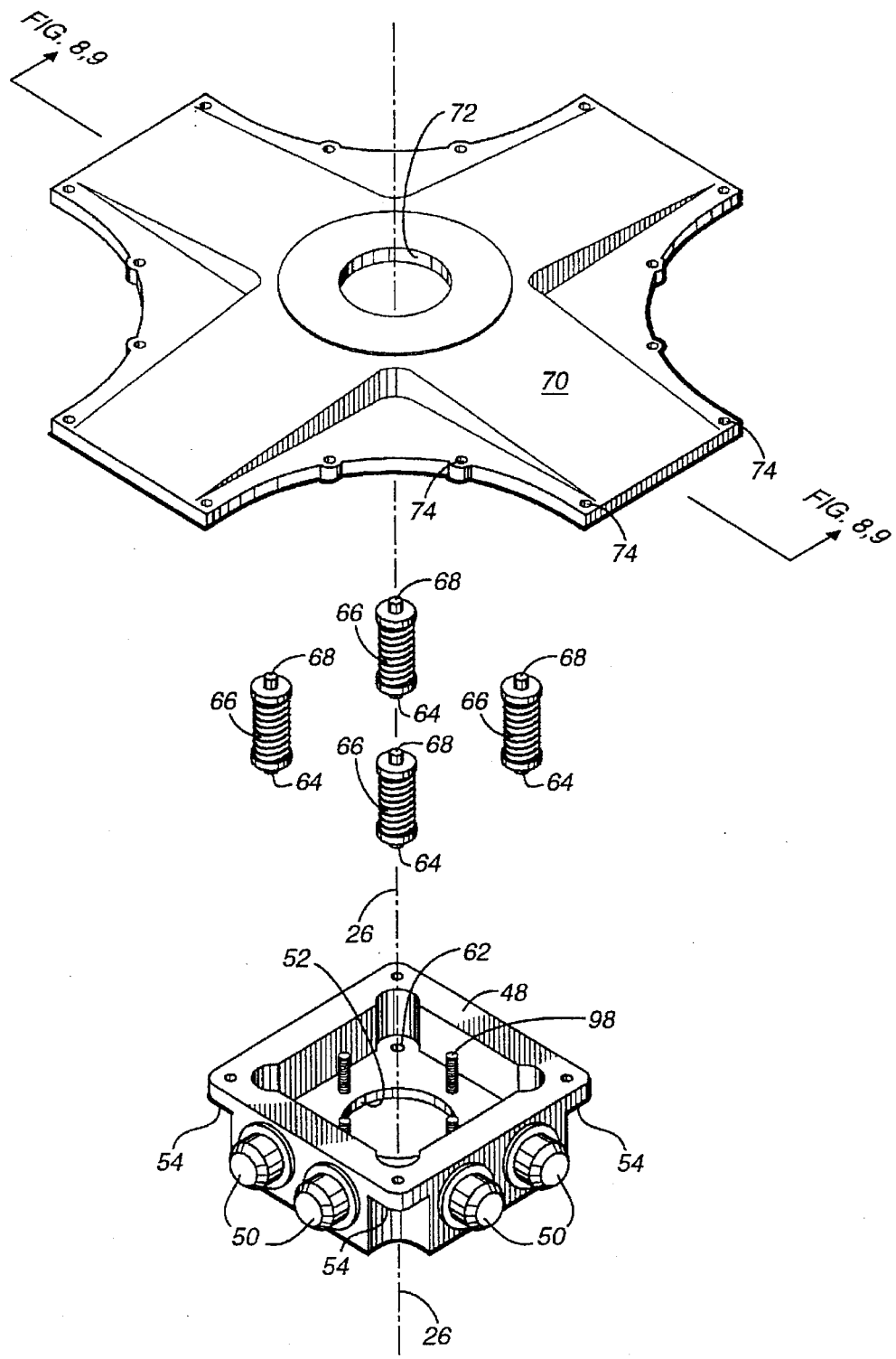
FIGS. 1A and 1B together are an exploded view of one embodiment of the present invention.

FIGS. 1A and 1B show an exploded view of the vibration absorber 20 of the present invention. The present invention has a base plate 22 which defines a passageway 24 therethrough around an axis 26 substantially perpendicular to the base plate 22. Base plate 22 may be of any desired shape and may be flat or may be of a varying contour. Base plate 22 can also define bolt holes 28 through which bolts may pass to attach the absorber to bolts attached to blade dampers.

Figure 9:
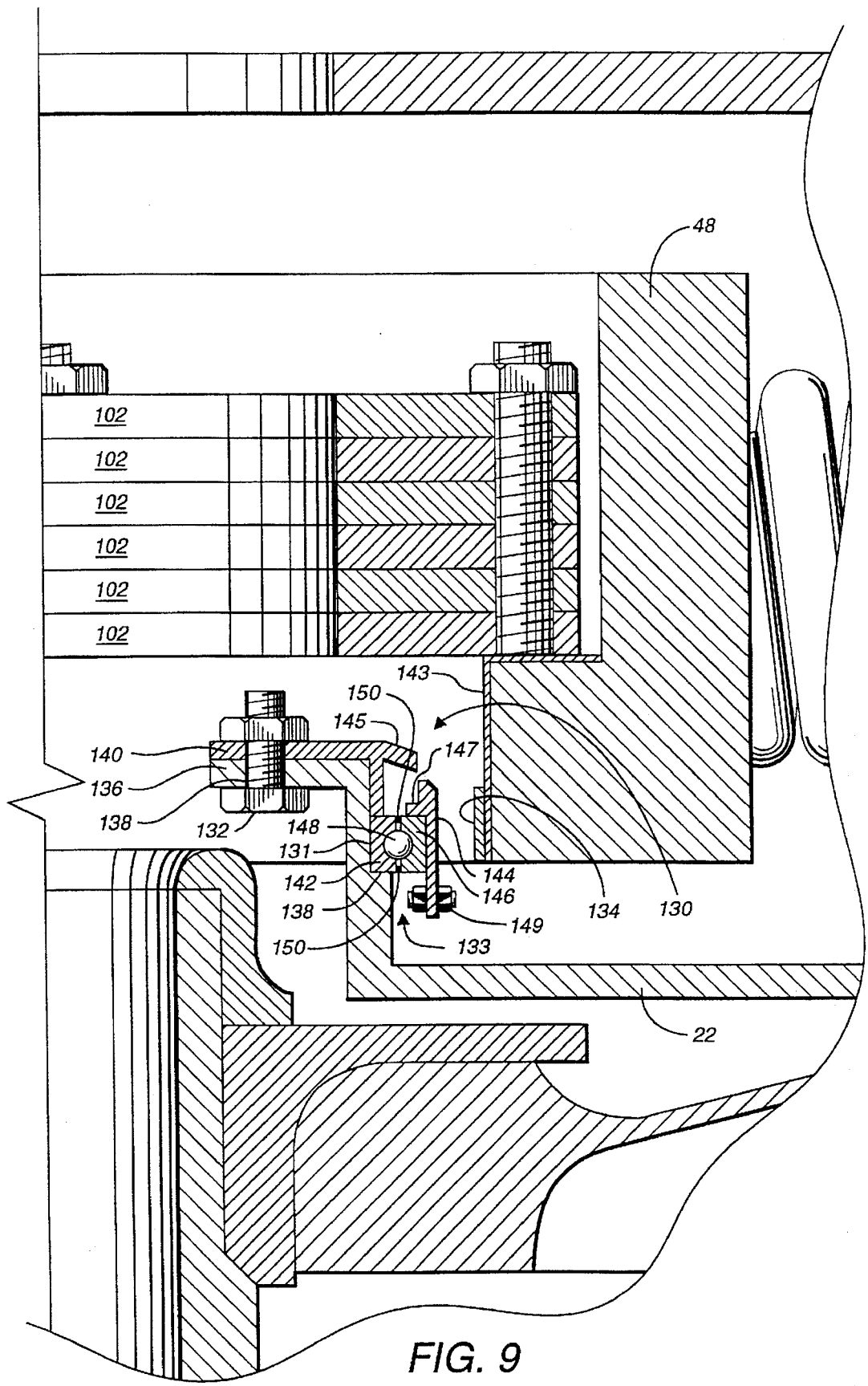
FIG. 9 is a partial cross section showing the motion limiter assembly.

Extending upwardly from the base plate 22 about the axis 26 is a cylindrical motion limiter 30. Motion limiter 30 can be made of a cylindrical metal inner tube with an outer concentric ring of self-lubricating material such as polytetrafluoro ethylene (Teflon). However, since the performance of such materials is affected by cold temperatures, the preferred construction of the motion limiter is shown in FIG. 9 and is discussed in more detail below. Extending upwardly from base plate 22 are retaining walls 34 having holes therein 35 through which springs 36 can pass. Clamp end plates 33 can have integral spring receptacles 37 (as shown on the left side of FIG. 1A). Alternatively, clamp end plates 33 can have spring positioning receptacles 39 in the form of passageways which receive indexing pin 41 of spring receptacles 43 (shown on right side of FIG. 1A). Clamp end plates 33 provide out-of-plane surfaces against which in-plane springs 36 rest. In a preferred embodiment, all the springs are precompressed when the absorber is assembled. These springs may be further compressed in use as the mass member shifts against a spring in response to vibrating loads.

Preferably, the in-plane spring retaining structure (the retaining wall 34 and clamp end plate 33 as assembled in the illustrated embodiment) are positioned symmetrically about the axis. Preferably, the number of retaining structures 45 is equal to the number of blades or a multiple number of blades employed. For example, in a two-bladed rotor system, two or four retaining structures are useful. A three-bladed system would preferably use three, six or nine retaining structures.

Extending between the retaining walls 34 there can be provided side wall 38 extending from the base plate. The side walls 38 are not necessary but are desirable from a safety standpoint to retain broken springs and to minimize the entry of debris into the vibration absorber 20. Side walls 38 can be provided with one or more inspection ports 42 which allow the maintenance personnel to inspect the unit without disassembly of the vibration absorber 20.

In an alternative construction, the absorber can include out-of-plane springs. The absorber preferably is constructed using only in-plane springs. Base plate 22 can also define in-plane spring positioning receptacles 32. As shown in this embodiment the spring positioning receptacle 32 are passageways.

Figure 5A:
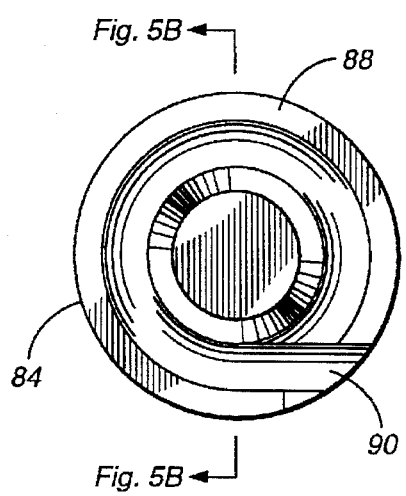
FIG. 5A is an end view of one embodiment of a spring receptacle.
Figure 5B:
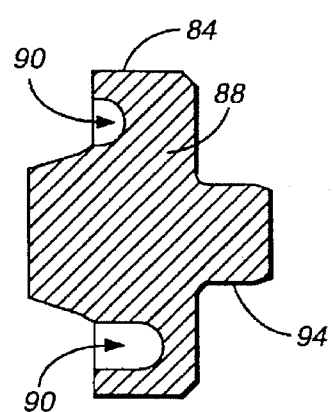
FIG. 5B is a cross-sectional view of FIG. 5A.
Figure 5C:
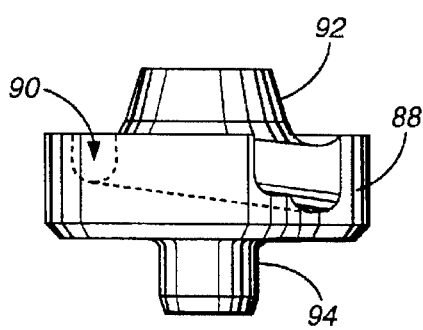
FIG. 5C is a side view of FIG. 5A.

In-plane springs 36 have an outboard end 44 and an inboard end 46. Outboard end 44 of the in-plane spring 36 rests against the clamp end plate 33 which can be provided with in-plane spring receptacles 37 or 43 or spring guides. The inboard end 46 of springs 36 rest against the mass member 48 which can be provided with in-plane spring guides 50. Spring guides 50 may be protrusions which fit inside the spring or can be holes which surround the outside diameter of the spring or can be spring receptacles as shown in FIGS. 5A, 5B and 5C. In the preferred embodiment mass member 48 is symmetrical and defines an opening 52 about the out-of-plane axis 26 of the absorber which is substantially normal to in-plane. The lower side of mass member 48 defines a cylindrical wall extending therefrom having a diameter larger than the diameter of the motion limiter (not shown in FIG. 1A). The mass member on its lower side can also define a lower out-of-plane and spring positioning receptacles 54. In the preferred embodiment, positioning receptacles 54 are passageways (not shown) for receiving an index pin 56 positioned on a spring receptacle at the top end of out-of-plane spring 58. The index pin 60 on the lower receptacle positioned at the lower end of out-of-plane spring 56 is received by spring positioning receptacles 32 in the base plate 22. It is to be understood that the spring positioning receptacles can be the spring receptacle having a helical channel in the mass member to receive the end of the spring which is discussed below. In this event, separate spring receptacles are shown in FIGS. 5A, 5B and 5C are not required. Preferably, the out-of-plane springs are positioned normal to the plane of the base, i.e., vertical to in-plane.

When the absorber is constructed with only in-plane springs, the in-plane springs hold the mass, when static, suspended such that it is spaced apart from the base plate and top plate and the retaining structures. Thus, the mass is free to move in five directions.

Figure 1B:
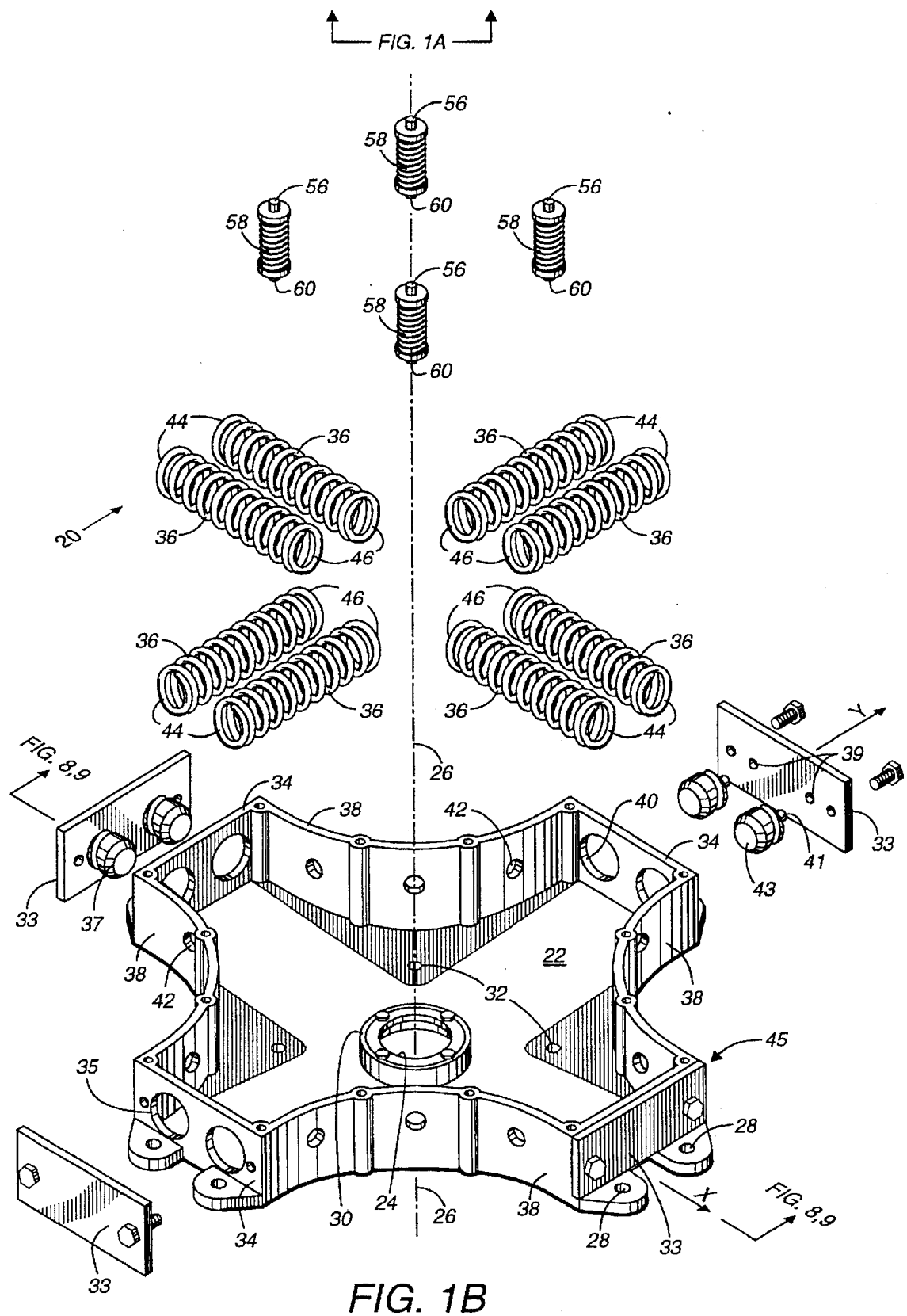

In an alternate embodiment, out-of-plane springs can also be used, and springs 58 are of sufficient length to hold mass 48 spaced apart from base plate 22 and permit the mass to move downwardly toward the base plate in response to vibrating loads. Mass unit 48 can also be provided with upper spring positioning receptacles 62 of desired shape. As shown in FIG. 1, these are passageways for receiving the lower indexing pin 64 of spring receptacles positioned at the lower end of upper out-of-plane spring 56. The upper indexing pins 68 positioned at the top of spring 66 are received in spring positioning receptacles (not shown) of the top plate 70. In the preferred embodiment top plate 70 defines a passageway 72 extending therethrough about the axis 26. Top plate 70 may also be provided with a series of holes 74 to allow passage of bolts for connection of the top plate to the base plate 22 and/or to the retaining structures and/or side walls. When assembled, upper out-of-plane springs 66 are of sufficient length to hold mass member 48 spaced apart from upper plate 70 such that mass unit may move upwardly.

When vibration absorber 20 is assembled in-plane springs 36 are preferably precompressed lower out-of-plane springs 58, if used, are preferably precompressed and upper out-of-plane springs 66, if used, are preferably precompressed. Thus, pressure is asserted in all three axes against the mass unit 48 resisting its movement.

Figure 3A:
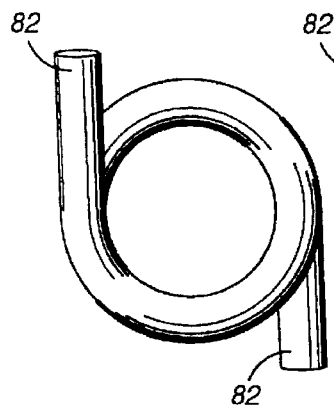
FIG. 3A is an end view of a spring especially useful in the present invention.
Figure 3B:
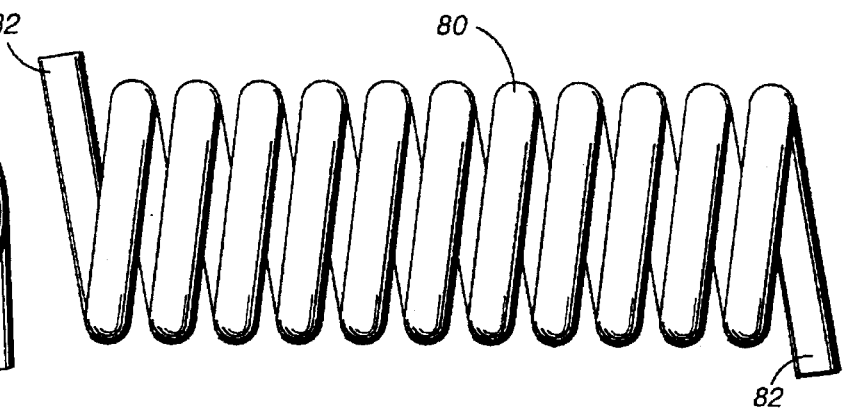
FIG. 3B is a side view of a spring especially useful in the present invention.
Figure 4:
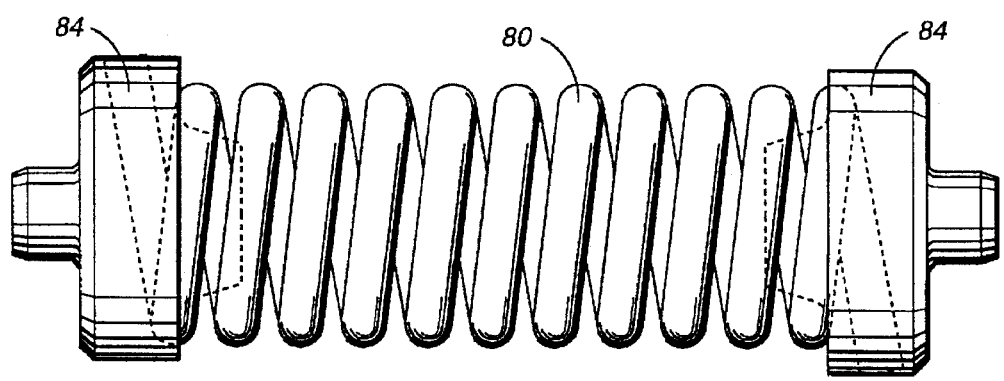
FIG. 4 is a side view of a spring assembly useful in the present invention.

It has been found that if out-of-plane springs are used that the design of the out-of-plane springs and the manner of their retention is important to construction of the vibration absorber. The major forces exerted on the mass member are in-plane. The movement of the mass member is primarily resisted by the in-plane springs when out-of-plane springs are also employed. The out-of-plane springs, however, also resist movement of the mass member in-plane. A coil spring deflected in compression is primarily subjected to shear stresses due to torsional movement of the spring wire. If sized properly for shear stresses, conventional closed/ground end coil springs have adequate fatigue life as long as fretting at the end is minimized. Such springs are useful for the in-plane springs. A coil spring subjected to shearing motion (especially "nutations" as in the case of the moving mass and rotor system) considerable bending stresses are induced at both ends of the out-of-plane springs in addition to the shear stresses due to compression alone. Nutation indicates a wobbling rotating motion of a disk. Conventional close/ground end springs were found to have very short life span when used as out-of-plane springs in the alternate embodiment of the invention. It was found that providing an anti-fretting spring receptacle minimized fretting and dramatically extended spring life. FIGS. 3A and 3B show an unground/open end coil spring 80 especially useful for the out-of-plane springs. Unground/open end spring 80 at each end has a tangential extension 82. Tangential extension 82 when received in a proper receptacle prevents rotation of the spring thereby minimizing fretting and eliminating spring compression change by screw thread effect. FIG. 4 shows the open end spring 80 and a helical spring receptacle 84 placed on each end. In the preferred embodiment of the invention, the out-of-plane springs 58, 66 have spring receptacles 84 positioned at each end. The spring receptacle may be a separate piece as illustrated or may be integrally formed in the base plate, mass member and top plate. These helical spring receptacles may also be used for the in-plane springs but are not required in the preferred embodiment.

In FIG. 5A, 5B and 5C the helical spring receptacle 84 is shown in detail. FIG. 5A is a top view of the helical spring receptacle 84. (Like numbers in like figures refer to like items). Helical spring receptacle 84 has a body 88 defining a helical groove 90. Helical groove 90 is dimensioned to receive the end of unground/open end spring 80 and to hold the extension 82 at the end of the spring. The extension 82 when received in the groove 90 prevents rotation of the spring with respect to the receptacle 84. Extending upwardly from the body 88 is a inside spring guide surface 92 dimensioned to fit within the inside diameter of the spring to assist holding it in place. Extending from the body in the opposite direction is indexing pin 94. In the preferred embodiment index pin 94 is inserted in spring positioning receptacles on the mass unit, the base plate and the top plate. Alternatively, the spring receptacle may be formed integrally on the base plate, mass member, and top plate. However, for ease of assembly the separate spring receptacle unit 84 is preferred.

Figure 2:
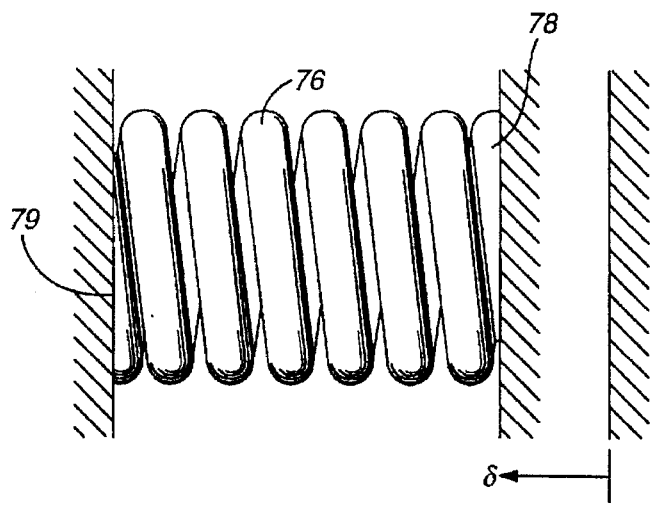
FIG. 2 is a side view of a conventional spring.

Conventional closed/ground end springs 76 are illustrated in FIG. 2. At the end 78 of such a spring, the end coil is of variable thickness such that it presents a flat surface 79. Such conventional springs are useful for in-plane springs 36. In the vibration absorber 20 the primary direction force exerted on the absorber are in the plane of the rotor. Forces exerted in the out-of-plane direction are much less. Thus, in-plane springs 36 will generally have a much greater compression spring rate than out-of-plane springs 56 and 66. In-plane springs may be either conventional closed/ground end springs or springs as shown in FIGS. 3A, 3B and 4. In resisting movement in-plane one must also factor in the effects of the out-of-plane springs for resisting in-plane displacement of the mass.

FIGS. 6A–6D are of the mass member 48. FIG. 6A is a top view of mass member 48. The mass body 96 is of any desired shape and as illustrated includes an area where mass tuning weights may be added. FIG. 6B is a cross-sectional view of FIG. 6A. Extending from body 96 are bolts 98. These bolts 98 are utilized to attach mass tuning weights to the mass member 48. Mass member 48 has a lower ridge 97 having a cylindrical inner surface 99. FIG. 6C shows a side view of mass member 48 with lower out-of-plane springs 58 and upper out-of-plane springs 66. FIG. 6D is a bottom view of FIG. 6A. FIG. 6D shows mass member 58 with ridge 97 forming an inner cylindrical surface 99 concentric with the axis and passageway 52.

FIG. 7A shows mass tuning weight 102 dimensioned to be attached to mass member 48. Mass tuning weight 102 defines bolt passageways 104. In the preferred embodiment weight 102 defines a central passageway 106 coincident with the center axis of the vibration absorber assembly. In the preferred embodiment, the passageways in the base plate, top plate and mass member have a common axis where the absorber is static. FIG. 7B shows a cross-sectional view of weight 102 along line B-B in FIG. 7A. Weights 102 are tuning weights which are attached to mass member 48 as needed. In the embodiment illustrated the weights are attached by passing bolts 98 through passageways 104. Weights may be added or removed from the mass member in order to tune the vibration absorber to each particular aircraft.

Figure 8:
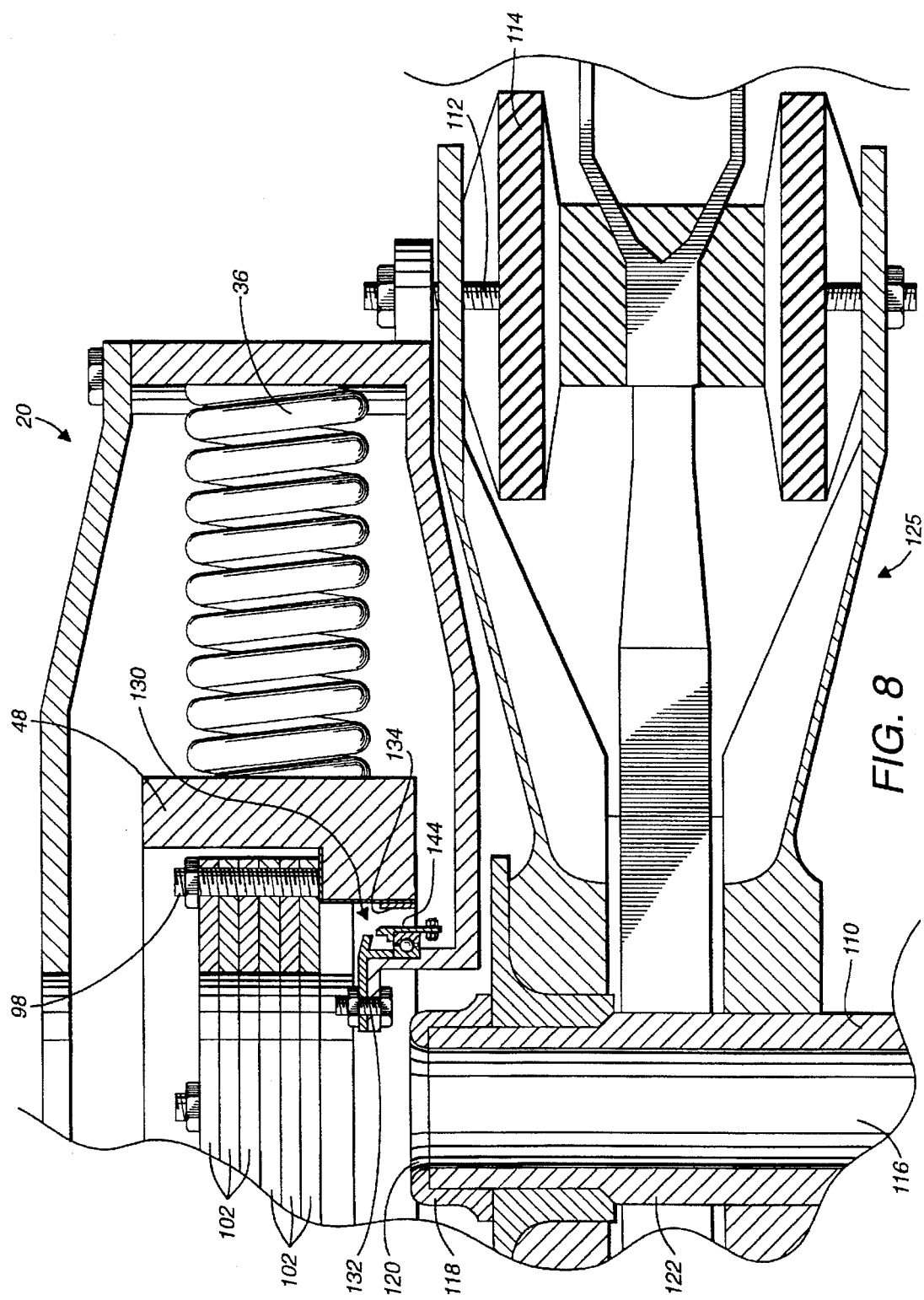
FIG. 8 is a partial cross-sectional view of one embodiment of the present invention attached to a rotor mast and blade support.

FIG. 8 is a partial cross-sectional view of the vibration absorber 20 attached to the bolt 112 of the elastomeric damper assembly 114 of rotor hub assembly 125. Rotor mast 110 defines a passageway 116 therethrough. At the top of the mast is rotor mast nut 118 which has a passageway therethrough 120. As can be seen, several tuning weights 102 are attached to mass member 48 providing additional mass added to tune the vibration absorber to the particular aircraft.

FIG. 8 shows the preferred embodiment of the motion limiter 130 of the vibration absorber 20. Motion limiter assembly generally indicated as 130 (assembly shown in greater detail in FIG. 9) can be held to the base plate 22 by bolt 132, or can be integrally formed on the base plate. Additionally, mass member 48 can be provided with rubber bumper 134.

FIG. 9 is a partial cross-sectional view showing the mass member 48, a series of tuning weights 102, and the base plate 22. The motion limiter is shown generally as 130. Base plate 22 in the preferred embodiment has a flanged section 136 defining a passageway 138 through which passes bolt 132. Extending upwardly from the base 22 is a bearing receiving surface 131 and a lower shoulder 138 extending outwardly. Bearing 133 is pressed down surface 131 until it contacts the shoulder 138. Bearing 133 has an inner race 142 and an outer race 146, balls 148 and seals 150. A clamp ring 140 is then pressed over the surface 131 to hold bearing 133 against the shoulder 138. Contact ring 144 is pressed over the outside of bearing 133. Contact ring 144 has an upper inwardly extending lip 147 which rests against the bearing outer race 146. At the bottom of contact ring 144 flush rivets 149 are installed to keep the contact ring 144 from sliding off the bearing 133. Flange 145 of clamp ring 140 extends out towards the contact ring 144 to deflect dirt and debris away from the bearing 133. Mass member 48 may be provided with a replacable ring 143. A rubber bumper 134 can be attached on the inner surface of the ring 143. Replacable ring 143 is useful to permit replacing the bumper 134 after it becomes worn. In operation, when the mass member 48 moves or is displaced sufficiently to cause bumper 134 to come in contact with the contact ring 144, the impact causes the contact ring 144 to move with the moving mass member 48 thereby minimizing scarring and damage to the motion limiter. During operation, the moving mass 48 runs up against the motion limiter substantially continuously in a rapidly vibrating manner as exemplified in FIG. 18.

Figure 18:
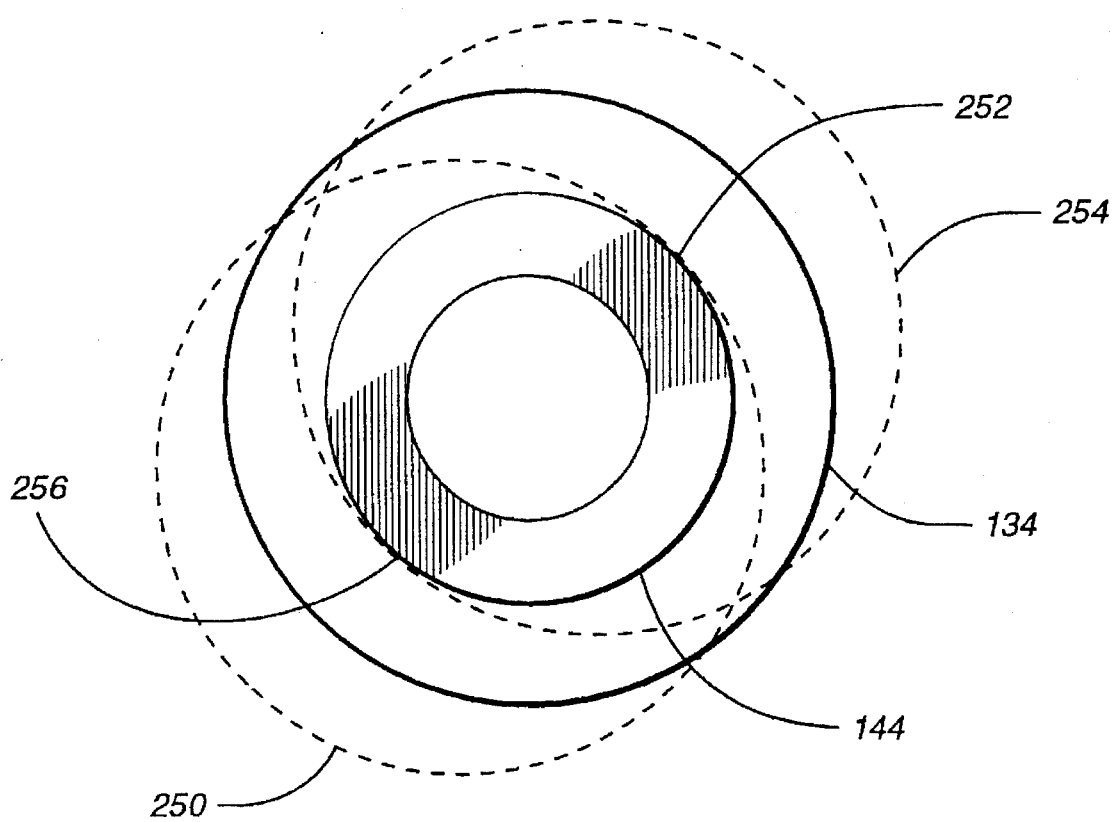
FIG. 18 is a diagram of the movement about the motion limiter.

FIG. 18 shows contact ring 144 and illustrates the bumper 134 location as the mass member vibrates. At a first position 250, the bumper makes contact with ring 144 at point 252. As the mass member moves about the motion limiter, the point of contact shifts and, for example, at a second position 254, the bumper makes contact at point 256. Mass member 48 does not rotate around the motion limiter because the in-plane springs prevent that. The mass member, however, can have slight rotational movement as the springs flex. Primarily, the mass member moves about the motion limiter such that the point of contact between the motion limiter and the mass is constantly changing or staying the same if the contact ring is spinning with movement of the mass. In a conventional vibration absorber, a properly tuned absorber will not have a mass member displacing sufficiently to make contact with the overtravel stops.

The present invention differs in its functioning from conventional vibration absorbers. A conventional vibration absorber minimizes vibration at a local area around its attachment point on the vibrating structure and its cantilever frequency is tuned to the frequency of the vibration needing to be reduced. On the other hand, the present invention is attached to a rotocraft hub in a rotating system and is intended to reduce vibration not at its attachment point but at the fuselage which is far removed from the hub. Therefore, the cantilever frequency of the present absorber is tuned so that it operates at or around a system resonance frequency where vibration of the absorber and the attachment point (in this case the hub), is maximized (in contrast to the conventional absorber), yet vibration of the fuselage is minimized.

Figure 13:
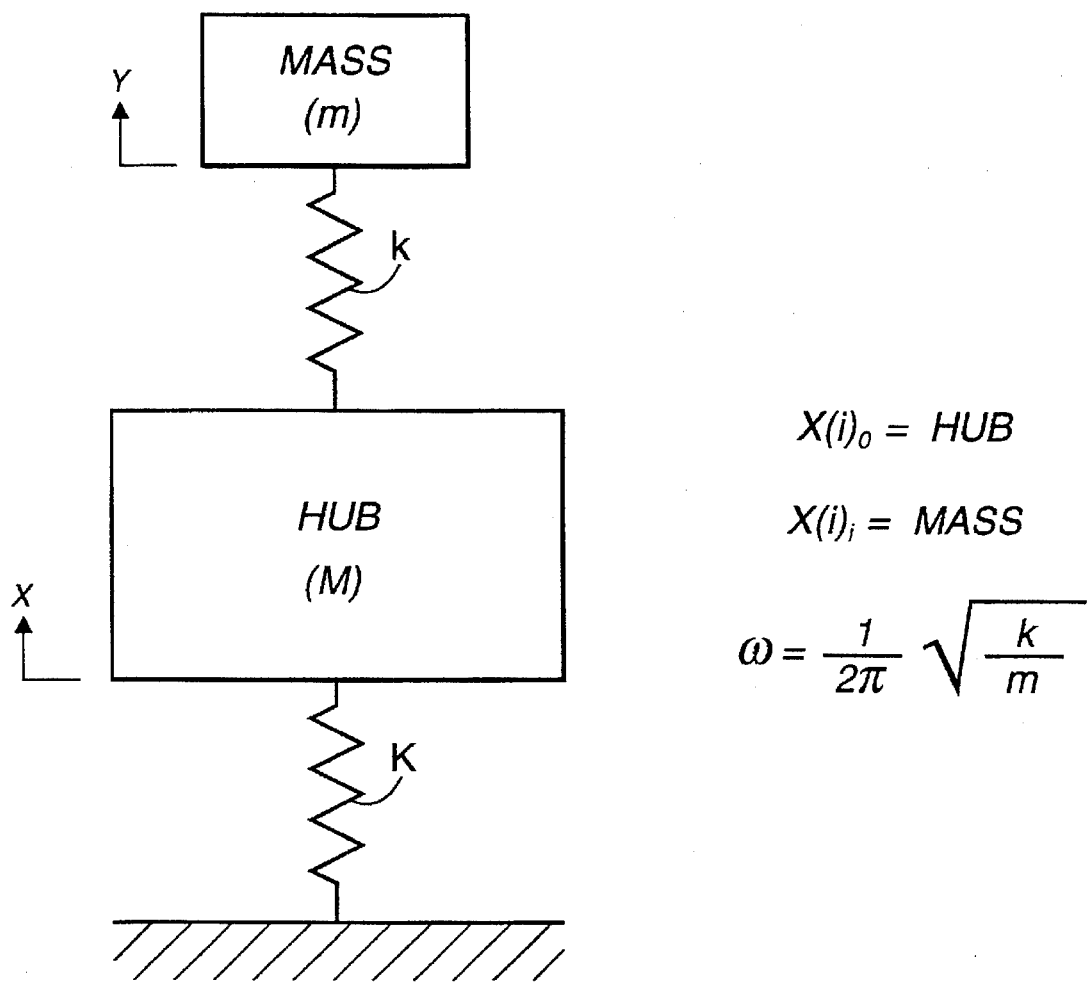
FIG. 13 is a spring mass schematic of the vibration faces.
Figure 14:
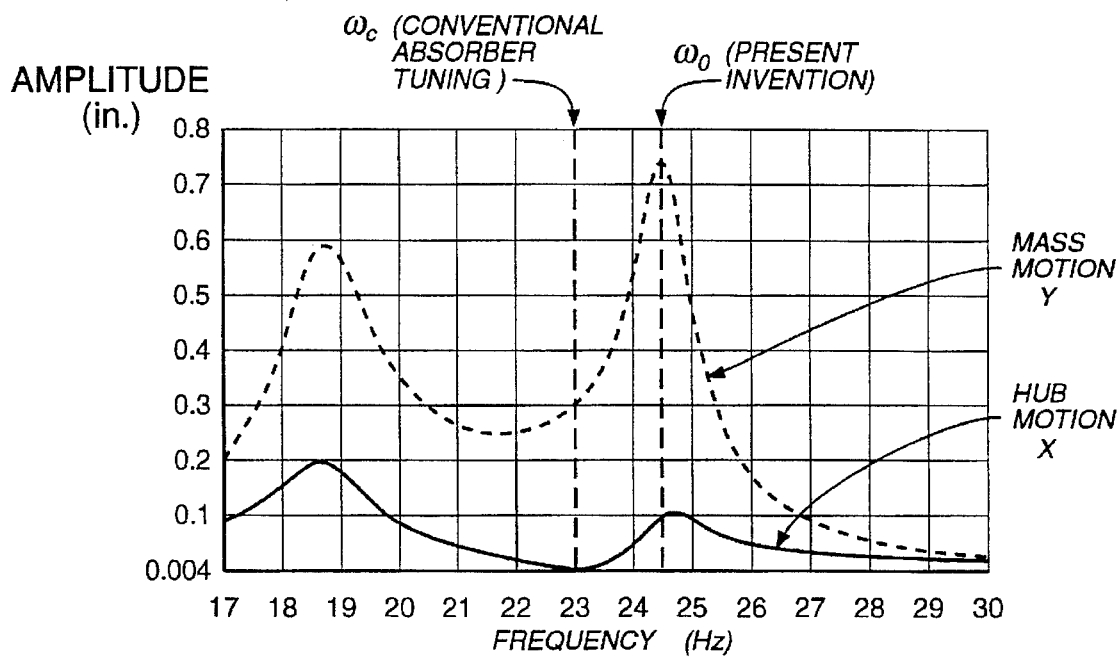
FIG. 14 is a graph illustrating the relationship of amplitude of the mass member and the amplitude of the hub at various frequencies.
Figure 15:
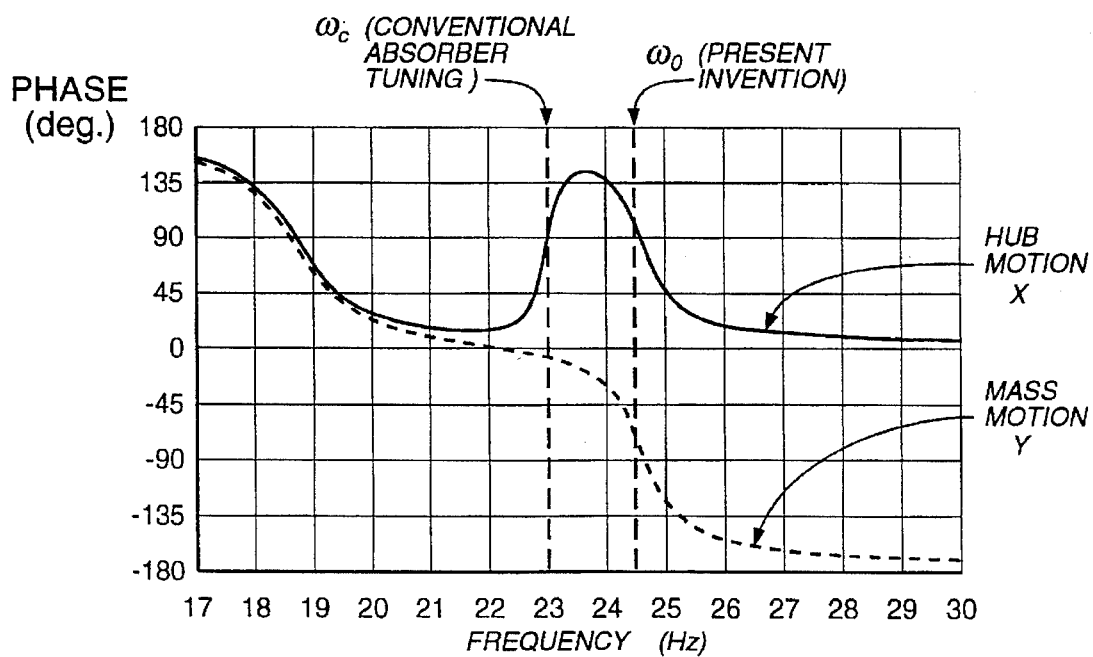
FIG. 15 is a graphical illustration of the phase of the moving mass and the hub motions.

This point is illustrated in FIG. 13 where frequency response of a two degree of freedom spring mass system, representing the absorber and the hub is shown. Equations for these computations can be found in *Theory of Vibration with Applications*, by William T. Thomson, published Prentice-Hall, Inc., at section 5.5. In FIG. 13, the small mass (m) and spring (k) represent the vibration absorber. The big mass (M) and big spring (K) represent the main dynamic system where its response represents the hub vibration. Displacement of hub (M) is shown by X, and displacement of mass (m) is shown by Y. In FIG. 14, amplitudes of small mass (absorber) and the main mass (hub) displacement are plotted together. Similarly the phase information is given in FIG. 15. In FIG. 15, the frequency at which the vibration of the fuselage needs to be reduced, that is the operating frequency, is indicated by $\omega_o$. It can be seen that the operating frequency is at or very close to the system resonance frequency where the amplitude of both the absorber and the hub are maximized. On the other hand, at frequency $\omega_c$ (cantilever frequency), marked on FIG. 14, which is lower than the operating frequency, the hub motion is minimized. $\omega_c$ corresponds to the cantilever frequency of the absorber which is given by $$\omega_c = \sqrt{\frac{k}{m}}$$

For conventional vibration absorbers, $\omega_c$ should be equal to the operating frequency at which the hub motion would be the least. This is not the case for the present invention as illustrated in FIGS. 14 and 15 where at the operating frequency the hub motion is substantially maximized at the operating frequency. (At n per rev (n=number of blades)).

Operating at the system resonance frequency makes the present invention a very efficient and lightweight vibration reduction device, however, it makes it difficult to tune and stabilize. It would be very sensitive to a small change in frequency. This is because the absorber operates at the peak of a lightly damped system at or near resonance. This problem was solved by a motion limiter which is designed as an integral part to the absorber in rotating system. The mass member makes a point contact with the motion limiter at any given time so that motion of the mass is limited and constant at any given time. The motion limiter assists in stabilizing the system. By operating the present invention at the peak of resonance, a higher amplitude of oscillation is provided than a conventional vibration absorber, thus a lighter weight system may be employed in the present invention to achieve the same results. In contrast, conventional vibration absorbers are designed such that the mass rarely, if ever, contacts the overtravel stops in use.

The vibration absorber rotates with the rotor hub. The vibratory load at the rotor hub causes the mass to move and contact the motion limiter at various points around the motion limiter substantially continuously.

The springs are tuned to provide the appropriate per-rev attenuation desired. Tuning can be done by measuring shear at the hub and determining the frequency to isolate. Then one can determine the weight and displacement needed to counteract that force. Thereafter, spring rate can be calculated to match the absorber to the frequency to be isolated. The per-rev attenuation desired will depend on the per-rev blade frequency for the number of blades in question. The first stage of tuning is to tune the springs to provide an initial set point. Fine tuning for particular characteristics of each aircraft can then be accomplished by addition or removal of the tuning weights 102. The discussion below will illustrate the spring tuning procedure for a four per-rev system. The example includes reference to out-of-plane, such as shown in FIG. 1A, springs because these springs can be used in an alternate embodiment. Those skilled in the art will appreciate the simplification of the equations for the preferred embodiment which has no out-of-plane springs. Tuning is done by tailoring the spring rate of in-plane and out-of-plane springs and the initial tuning mass. The initial tuning mass may be the mass member alone or may be the mass member with a desired number of initial tuning weights. In any event, the tuning mass is the initial weight of the unit to be installed in the aircraft. When the initial tuning weight includes the weight of tuning weights as well as the mass, then an opportunity is available later to remove tuning weights if necessary to tune the vibration absorber for idiosyncrasies of individual aircraft.

The desired torsional, vertical and pitch/roll frequencies are achieved by controlling the radial location of the springs, and the tuning weight, and spring rate. The desired spring rate of the system is achieved by controlling the number, diameter of the spring, diameter of the spring wire, number of coils and amount of precompression.

In the invention, the displacement of the mass and vibration absorption is provided by the compressing and shearing forces on the in-plane coil springs used to center the tuning weight and the shearing forces of the out-of-plane coil springs.

The spring rate due to compression for each spring is expressed by the formula below:

$$K_c = \frac{P}{\delta_c} = \frac{Gd^4}{8D^3N_a}$$

P—compressive force, pounds
$\delta_c$—spring compression, inches
G—shear modulus, lb/in$^2$
d—wire dia, in
D—mean dia, in
$K_c$—compression spring rate, lb/in
$N_a$—number of active coils The spring rate due to shear is computed by the following:

$$K_{sh} = \frac{P}{\delta_{sh}} = K_c f(\delta_{pc})$$

$K_c$—compression spring rate, lb/in
$\delta_{sh}$—shear deflection, in
$\delta_{pc}$—pre-compression, in
$K_{sh}$—shear spring rate, lb/in
P—shearing force, lbs.
$f(\delta_{pc})$—function of precompression Shear stress due to compression is determined by the formula:

$$\tau = \frac{8K_cD}{\pi d^3} \cdot K_w \cdot \delta$$

$\tau$—shear stress, lb/in$^2$
$K_c$—compression spring rate, lb/in
D—mean diameter of spring, inch
d—wire diameter, inch
$K_w$—stress correction factor
$\delta$—deflection, inch The in-plane spring rate is determined by the following formula:

$$K_i = nK_1 + mK_1^* + oK_v^*$$

n—number of in-plane springs in the direction of displacement
m—number of in-plane in a direction normal to the displacement
o—number of out-of-plane springs
$K_1$—compression spring rate of the in-plane springs
$K^*_1$—lateral spring rate of the in-plane spring (the shear direction)
$K^*_v$—lateral spring rate of out-of-plane spring For the embodiment shown in FIG. 1 the formula becomes:

$$K_i = 4K_1 + 4K_1^* + 8K_v^*$$

The vertical spring rate is determined by the formula:

$$K_v = oK_v + bK_1^*$$

$K_v$—compression spring rate of out-of-plane springs
$K^*_i$—lateral spring rate of in-plane springs
o—number of out-of-plane springs
b—number of in-plane springs for the embodiment shown, the formula becomes $$K_v = 8K_v + 8K^*_1$$

The torsional spring rate is determined by the formula:

$$K_T = \frac{\theta}{2} K_v^*(X_2^2 + Y_2^2) + \frac{\theta}{2} K_v^*(X_3^2 + Y_3^2) + jK_1^*(X_1^2 + Y_1^2)$$

$K^*_1$—lateral spring rate of in-plane spring
j—number of in-plane springs

θ—number of out-of-plane springs $X_1$—distance long axis of the in-plane spring offset from axis passing through center of spring stop $Y_1$—distance the end of the in-plane spring is offset from the vertical axis of the vibration absorber.

$X_2$—distance of lower out-of-plane springs from vertical axis of the vibration absorber $Kv^*$—lateral spring rate of out-of-plane springs $X_3$—distance of upper out-of-plane spring from vertical of the vibrator absorber.

$Y_2$—distance of lower out-of-plane springs from axis of symmetry.

$Y_3$—distance of upper out-of-plane springs from axis of symmetry.

Figure 10A:
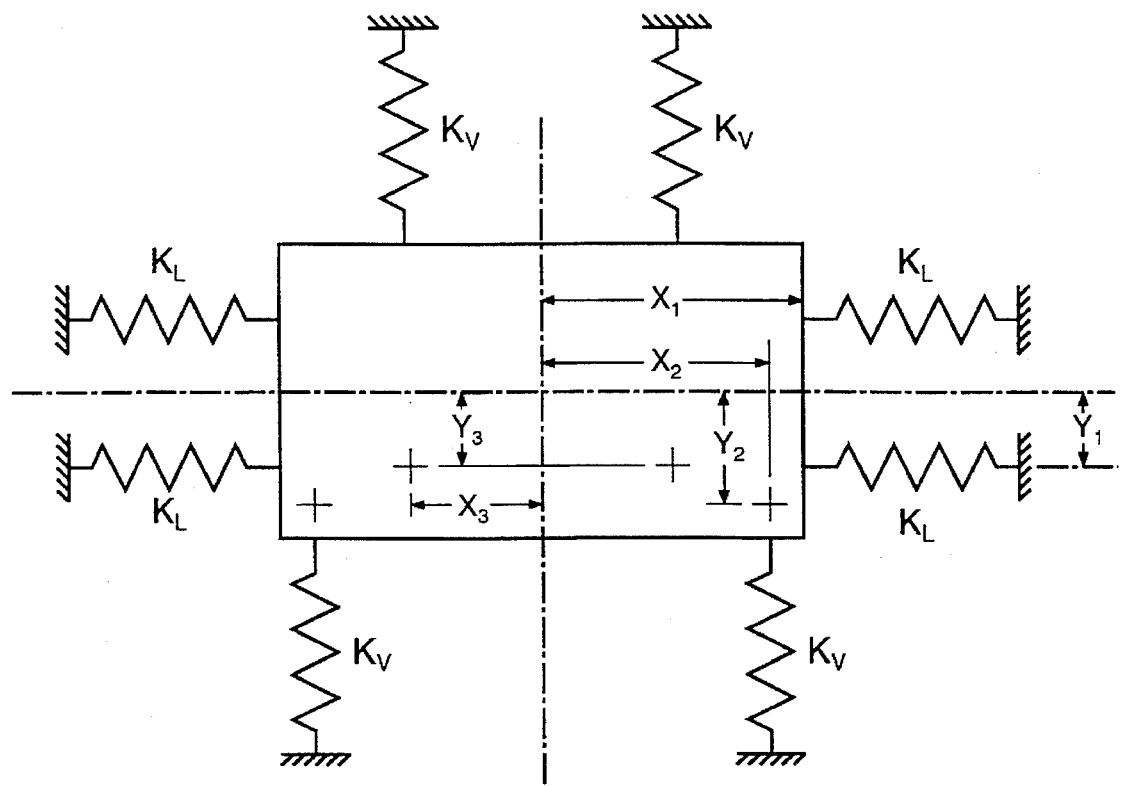
FIG. 10A is a schematic drawing of the springs and mass.
Figure 10C:
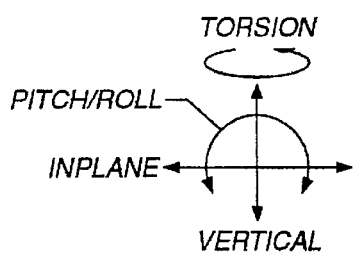
FIG. 10C is a drawing showing the directions of motion.
Figure 10B:
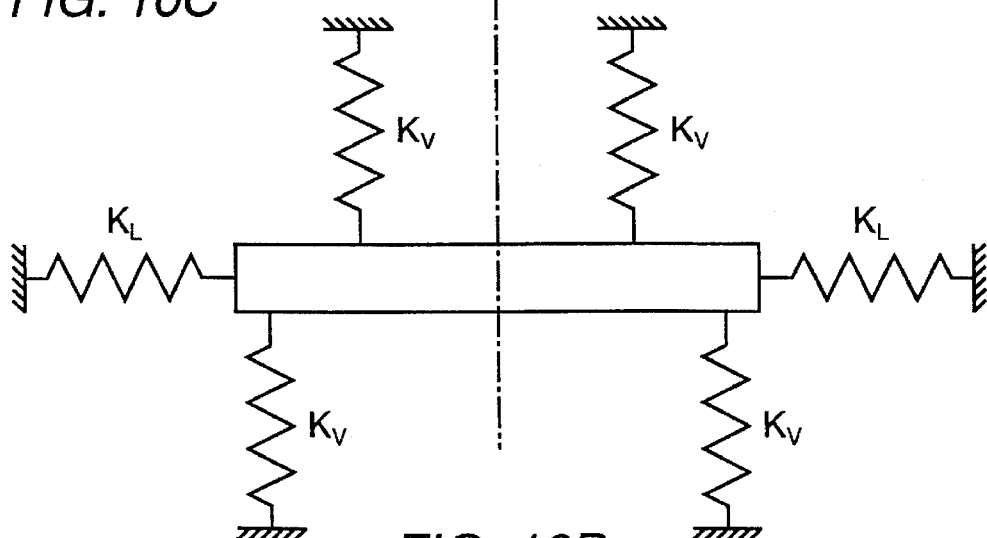
FIG. 10B is a side view of spring and mass schematic drawing.

These relationships are shown graphically in FIGS. 10A and 10B. $X_2$ and $X_3$ and $Y_2$ and $Y_3$ may be the same depending on the design placement of the springs. For the embodiment shown in FIG. 1, the formula becomes:

$$K_r = 4K_v^*(X_2^2 + Y_2^2 + X_3^2 + Y_3^2) + 8K_1^*(X_1^2 + Y_1^2)$$

The pitch and roll spring rate is determined by the formula:

$$K_{PITCH} = n\, K_1^*(X_1^2 + Y_1^2) + m\, K_v(X_2^2 + X_3^2)$$

$$K_{ROLL} = n\, K_1^*(X_1^2 + Y_1^2) + m\, K_v(Y_2^2 + Y_3^3)$$

n—number of in-plane springs
m—number of out-of-plane springs

FIG. 10C shows the directions in which forces may be applied to the mass member.

FIG. 10A and 10B show schematically by mass and spring diagrams applicable to the above equations.

Figure 11:
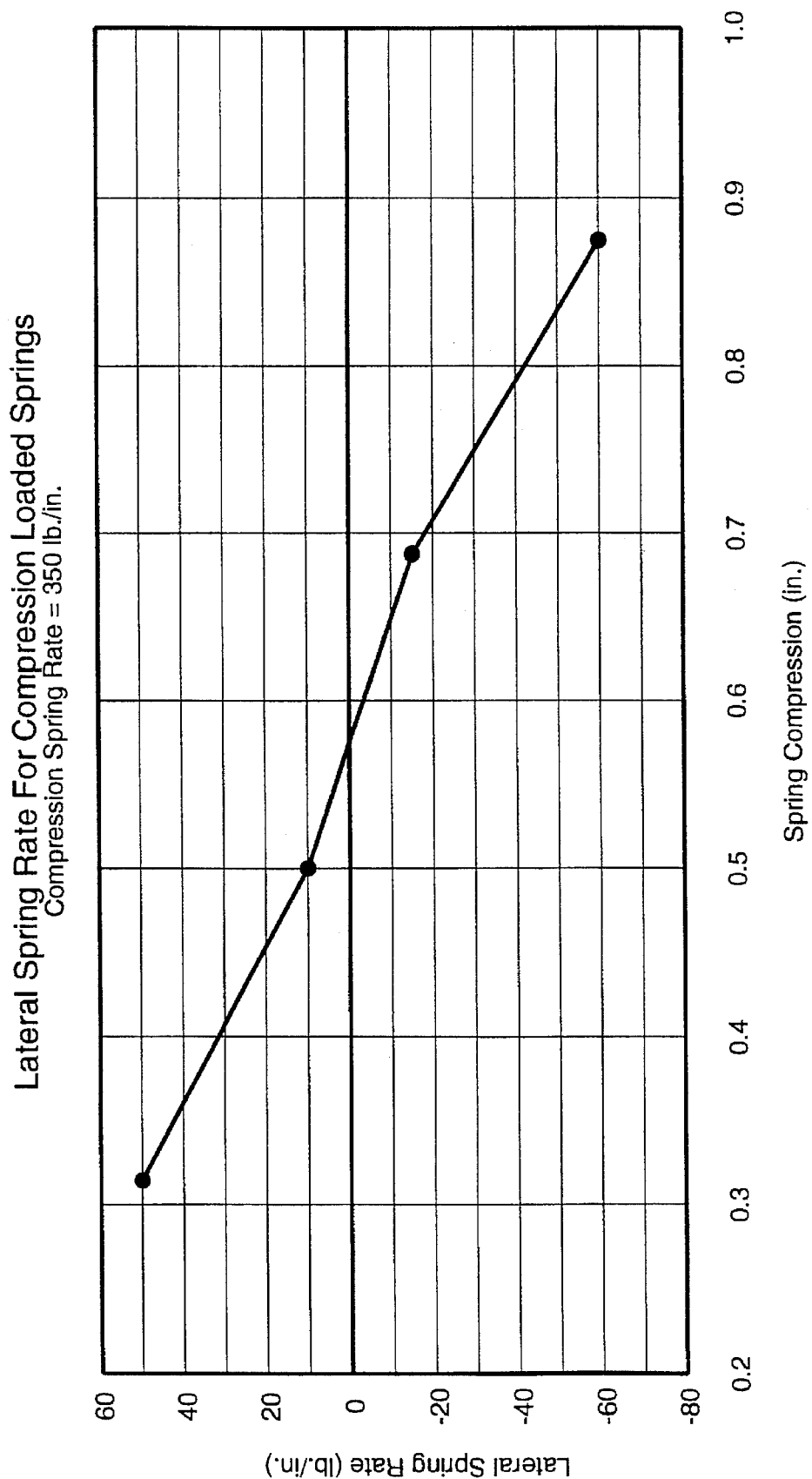
FIG. 11 is a chart showing the effect of precompression on lateral spring rate.

As shown in FIG. 11, precompression of the springs effects lateral spring rate. In the above formulas the pre-compressed rates should be used corresponding to the pre-compression of the spring at the set position.

Figure 12A:
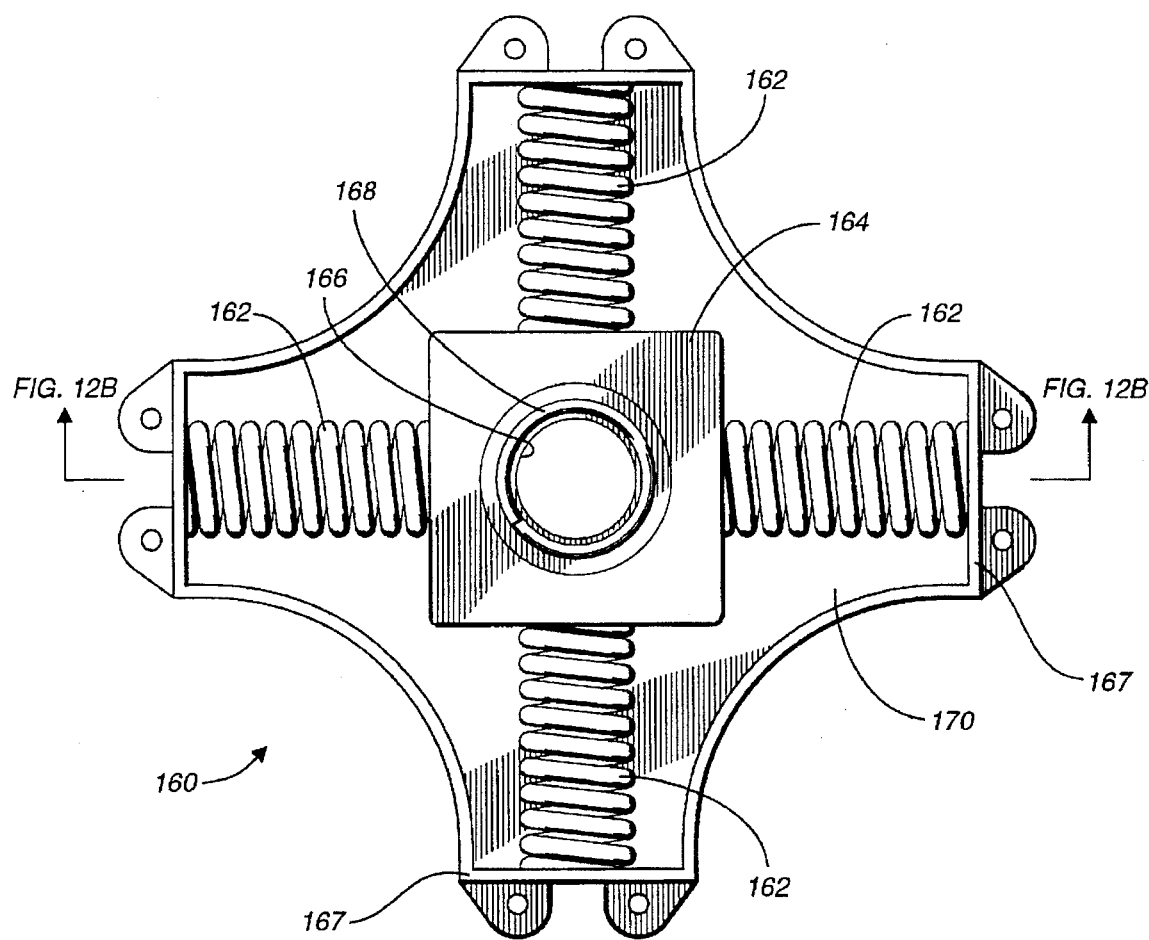
FIG. 12A is a top view of another embodiment of the present invention without the top plate.

In the embodiment shown in FIG. 1, there are eight in-plane springs. For considerations of size, this eight spring configuration is useful. However, the eight springs could be replaced by four springs. Also shown in FIG. 1 are four out-of-plane lower springs and four out-of-plane upper springs used in the alternate embodiment. It is not necessary to utilize four springs, one or more springs can be used both in the upper position and the lower position provided that the upper springs are symmetrically arranged about the axis at the rotor mass and that the lower out-of-plane springs are located or positioned symmetrical to the axis of the rotor mass. FIG. 12A is a top view of a vibration absorber 160 showing four in-plane springs 162 holding mass 164 spaced apart from spring stops 166. Mass 164 has an opening 166 concentric with the axis of the rotor mast and concentric about the opening is out-of-plane upper spring 168. The mass 164 is held spaced apart from the base plate 170 by lower out-of-plane spring 172 (shown in FIG. 12B) and upper out-of-plane spring 168 and the top plate (not shown).

Figure 12B:
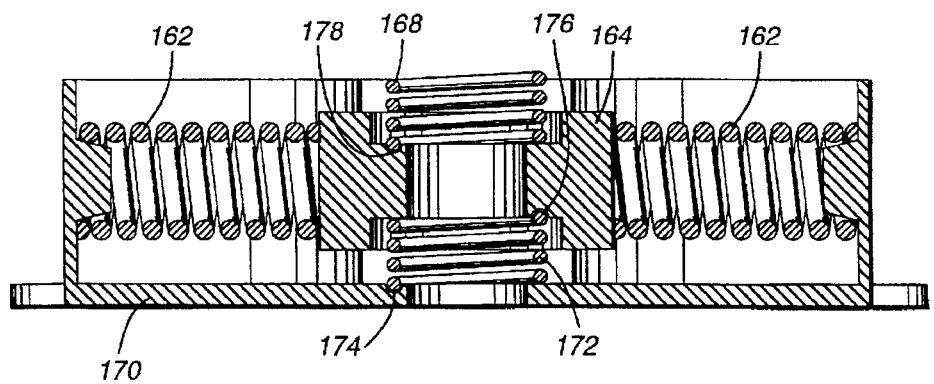
FIG. 12B is a cross-sectional view of FIG. 12.

FIG. 12B is a cross-sectional view of FIG. 12A along line BB. In FIG. 12B, the motion limiter is not shown for clarity, but would be positioned on the outer side of spring 172. Base plate 170 includes a helical spring receptacle 174 which receives lower end of spring 172. The shape of the channel of helical spring receptacle 174 is the same as shown in FIGS. 5A and B, only that the channel is formed in the base plate itself.

Mass member 164 has a lower surface with a helical receiving channel formed therein to receive the upper portion of the lower out-of-plane spring and has a helical spring receiving channel 178 of the upper surface of mass member 164 receiving the outer upper helical spring. A similar helical receiving channel for the upper spring would be provided on the top plate. The number of springs for the in-plane springs and the out-of-plane springs can be varied. The respective springs should be placed symmetrical to allow for tuning. In the case of odd numbered springs the above formulas would have to be adjusted taking into consideration the geometry and direction of forces. This should be something within the ordinary skill of those in the art to make such adjustments.

Figure 16A:
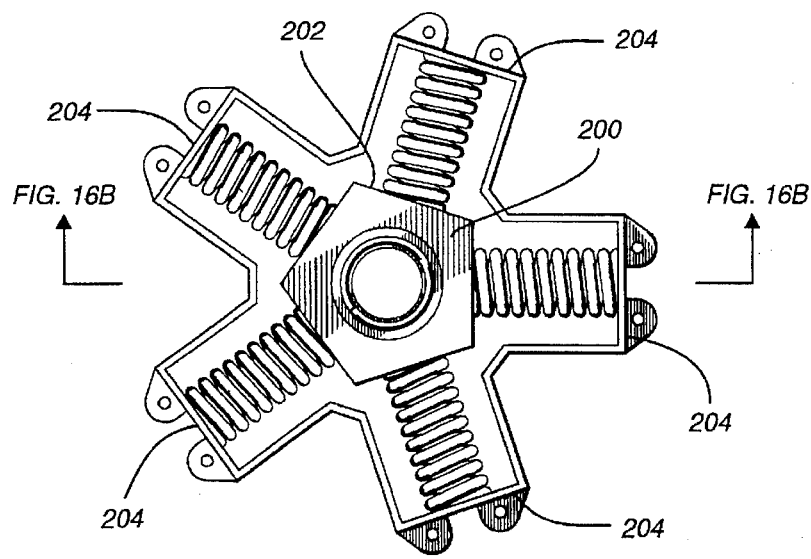
FIG. 16A shows an embodiment for a five-bladed system
Figure 16B:
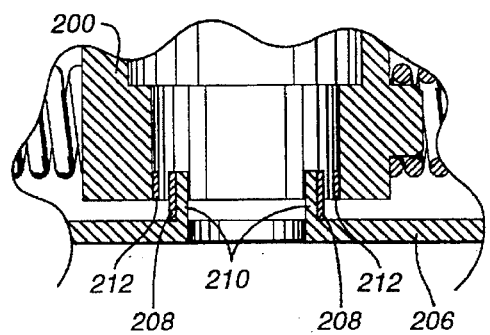
FIG. 16B is a cross-sectional view of FIG. 16.
Figure 17:
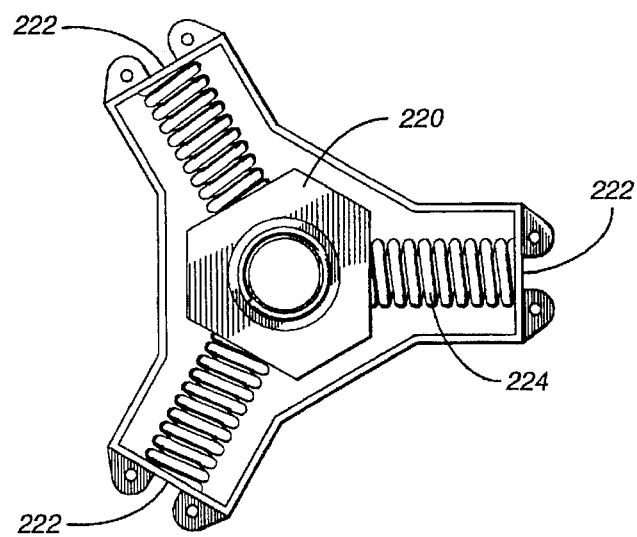
FIG. 17 is an embodiment suitable for a three-bladed system.

FIGS. 16A and 17 show the embodiments of the present invention without top plates. FIG. 16 illustrates a design suitable for a five-bladed rotor system, where mass member 200 has five out-of-plane side walls 202 positioned symmetrically about the out-of-plane axis of the vibration absorber. Likewise, five retaining structures 204 are spaced symmetrical and apart from the mass 200 such that mass 200 when static is supported spaced apart from the retaining structures 204 and the base plate 206. FIG. 16B is a cross section of FIG. 16A. In these embodiments, no out-of-plane springs are used. Also here the motion limiter is constructed of a contact ring 208 of self-lubricating material such as polytetrafluoro ethylene, which encircles upwardly extending support 210 of the base plate 206. Ring 208 may be attached to the support or may be sized such that it will rotate about the support similar to the bearing assembly previously discussed. Preferably, a bumper pad of self lubricating is also provided on the inner surface of mass 200 which encircles ring 208. As mass member 200 moves, the bumper pad of self-lubricating material contacts the contact ring 208 of self-lubricating material and allows the mass to move about the motion limiter.

FIG. 17 shows a three-sided mass 220 together with a base plate having three symmetrically spaced retaining structures 220 and three in-plane springs 224.

The present invention has been described in terms of the preferred embodiments, and variations thereof will be readily understood by those skilled in the art.

We claim:

1. A vibration absorber comprising:
   (a) a base plate having a top and bottom sides with an axis substantially normal thereto;
   (b) two or more spring retaining structures extending from said plate upwardly;
   (c) a motion limiter extending upwardly from said base plate about said axis;
   (d) a mass member having a predetermined shape having a top side, bottom side and out-of-plane sides and having a cylindrical surface extending downwardly therefrom and encircling said motion limiter;
   (e) one or more in-plane springs positioned between each of said retaining structures and one of the out-of-plane sides of said mass member and holding said mass member when static spaced apart from said retaining structures; and
   wherein said springs are selected such that said mass member during operation runs up against said motion limiter substantially continuously in a rapidly vibrating manner.

2. The apparatus of claim 1 wherein said in-plane springs are precompressed.

3. The apparatus of claim 1 wherein said mass member also includes one or more mass tuning weights attached to said mass unit.

4. The apparatus of claim 1 wherein said motion limiter has a contact ring which is rotatable with respect to the base plate.

5. The apparatus of claim 1 wherein said absorber is tuned to a frequency at which a hub motion of a hub with a predetermined number of blades is maximized.

6. A vibration absorber for helicopter rotor systems comprising:
   (a) a base plate having a top and bottom side and an axis perpendicular thereto and defining a passageway concentric about the axis and a motion limiter assembly extending therefrom;
   (b) two or more spring retaining structures extending upwardly from said base plate, said structures being spaced apart from said axis;
   (c) a mass member having an axis therethrough and defining a passageway therethrough about the axis, said mass member having top side bottom side and out-of-plane sides and having a bumper surface;
   (d) one or more in-plane springs positioned between each of said spring retaining structures and a corresponding out-of-plane side of said mass member to hold the mass member spaced apart from each of said retaining structures; and
   (e) said motion limiter assembly comprising a bearing assembly having one side attached to said base plate and the other side attached to a contact ring such that the ring is rotatable with respect to said base plate.

7. The apparatus of claim 6 wherein said in-plane springs are precompressed.

8. The apparatus of claim 6 wherein said mass member also includes one or more mass tuning weights attached to said mass unit.

9. The apparatus of claim 6 wherein said absorber is tuned to a frequency at which a hub motion of a hub with a predetermined number of blades is maximized.

10. A vibration absorber for helicopter rotor systems comprising:
    (a) a base plate having a top and bottom side and an axis perpendicular thereto and defining a passageway concentric to said axis, and spring receptacles on the top side of said base;
    (b) spring retaining structure extending upwardly from said base plate, said structures being spaced apart from said axis;
    (c) a mass member defining a passageway therethrough about an axis, and having a top side, bottom side, and out-of-plane sides, and spring receptacles on the top and bottom side and a bumper surface;
    (d) a top plate attached to said base and defining a passageway about its axis, top and bottom side, and spring receptacles in said bottom side;
    (e) one or more lower out-of-plane springs having a top and bottom end, the ends being positioned in the receptacles of said base plate and said mass member;
    (f) one or more upper out-of-plane springs having a top and bottom end, the ends being positioned in the receptacles of said base plate and said mass member;
    (g) one or more in-plane springs positioned between each of said retaining structures and corresponding out-of-plane of said mass member;
    (h) wherein said mass member is held by said spring spaced apart from said base plate, top plate and retaining structures when at rest; and
    (i) a motion limiter extending from said base plate and positioned such that it will be contacted by said bumper surface when the mass member is subjected to vibrating loads.

11. The apparatus of claim 10 wherein said motion limiter comprises:
    (a) a bearing with an inner and outer bearing race with bearings therebetween, said inner race positioned on said base plate and extending therefrom; and
    (b) a contact ring adjacent to said outer bearing race, said contact ring being rotatable with respect to said base.

12. The apparatus of claim 11 further comprising mass tuning weights attached to said mass member.

13. The apparatus of claim 10 further comprising side walls extending between said base plate and said top plate or said retaining structures interposed within said side walls.

14. The apparatus of claim 10 wherein four retaining structures are provided, two in-plane springs are provided between each retaining structure and the out-of-plane side of said mass member.

15. The apparatus of claim 11 wherein there are four lower out-of-plane springs and four upper out-of-plane springs.

16. The apparatus of claim 11 wherein said spring receptacles have a helical groove to receive the end of said springs.

17. The apparatus of claim 16 wherein said springs are coil springs with tangential extension at each end.

18. The apparatus of claim 16 further comprises sidewalls connecting the retaining structures and defining inspection port passageways.

19. The apparatus of claim 10 wherein said absorber is tuned to a frequency at which a hub motion of a hub with a predetermined number of blades is maximized.

* * * * *

UNITED STATES PATENT AND TRADEMARK OFFICE
CERTIFICATE OF CORRECTION

PATENT NO. : 5,647,726
DATED : July 15, 1997
INVENTOR(S) : Sehgal et al.

It is certified that error appears in the above-indentified patent and that said Letters Patent is hereby corrected as shown below:

Column 3, line 41, before "amplitude" insert --the--.

Column 3, line 62, replace "pere-rev" with --per-rev--.

Column 12, Claim 1, line 59, before "wherein" insert --(f)--.

Signed and Sealed this

Twenty-third Day of December, 1997

Attest:

BRUCE LEHMAN

*Attesting Officer*              *Commissioner of Patents and Trademarks*